United States Patent [19]

Chen

[11] Patent Number: 4,945,944

[45] Date of Patent: Aug. 7, 1990

[54] FILL VALVE FOR TOLIET TANKS

[76] Inventor: Shu-Yuan Chen, No. 15, Alley 5, Lane 217, Chung Hsiao East Road., Sec. 3, Taipei, Taiwan

[21] Appl. No.: 372,472

[22] Filed: Jun. 28, 1989

[51] Int. Cl.[5] .................... F16K 31/34; F16K 21/20
[52] U.S. Cl. .................................. 137/403; 137/414; 137/426
[58] Field of Search ............... 137/393, 403, 414, 426, 137/436, 437, 218; 73/290 R, 299

[56] References Cited

U.S. PATENT DOCUMENTS

| | | | |
|---|---|---|---|
| 2,646,817 | 7/1953 | Cox et al. | 137/393 |
| 2,665,706 | 1/1954 | Hansen | 137/393 |
| 4,065,095 | 12/1977 | Johnson | 137/414 |
| 4,094,327 | 6/1978 | Brandelli | 137/414 |
| 4,182,364 | 1/1980 | Gilbert et al. | 137/426 |
| 4,292,996 | 10/1981 | Pataki et al. | 137/393 |
| 4,340,082 | 7/1982 | Straus | 137/426 |
| 4,574,826 | 3/1986 | Johnson | 137/414 |
| 4,765,363 | 8/1988 | Pi-Yu | 137/414 |
| 4,887,635 | 12/1989 | Johnson | 137/393 |

Primary Examiner—George L. Walton
Attorney, Agent, or Firm—Burns, Doane, Swecker & Mathis

[57] ABSTRACT

A fill valve for use with toilet tanks is configured to include an extensible pipe unit of an inlet and an outlet pipes for adjusting the water level and a telescopic air cylinder acting also for adjustment of the water level. A valve body is provided therein with a main valve including a diaphragm to be driven by the difference in pressure to open and close an inlet valve seat for water filling and an auxiliary valve of a further diaphragm to actuate and direct the opening and closing of the main valve by the air pressure so as to perform water filling and water stoppage of the tank. The arrangement allows the main valve to forcibly and effectively close an inlet valve port having a diameter of opening far greater than that of a conventional fill valve especially by way of difference in the water pressure whereby it greatly enhances the speed of water filling while reduces the filling time.

3 Claims, 4 Drawing Sheets

FILL VALVE FOR TOLIET TANKS

BACKGROUND AND SUMMARY OF THE INVENTION

The present invention relates to a fill valve for rapidly filling toilet tanks with water, for achieving effective water stoppage and for ready adjustment of water level in the tanks by control of the difference in pressure.

It has been known that a conventional fill valve used with toilet tanks includes a water inlet pipe having at the upper end thereof a fill valve, a control unit for controlling the fill valve, a slender connecting arm connected to the control unit and a float bowl provided at the end of the arm. Owing to the presence of the slender float arm extending transversely in the toilet tank and the float bowl with a considerably large volume, not only is the valve cumbersome in its external appearance but the valve itself occupies most of the space inside the tank. Among the many disadvantages associated with this type of fill valves, the most important is that, because of the considerable limitation with the volume of the float bowl and the length of the connecting arm inside a typical toilet tank, there has not been possible for the fill valve to produce a strong moment for closing of the valve. Consequently, this results in the force of the valve disc of the fill valve to close the valve seat becoming very weak. Hence, in order to enable the fill valve, after the toilet tank has been filled with water, to be closed with the aforesaid force, the diameter of opening in the valve seat, namely, the valve port, must be made of small diameter, about 5mm. Otherwise, if the valve port were large, the area on the valve disc would increase and water pressure to be borne on the valve seat would also be increased. Again, it is also because the valve port is large and the amount of flow rather low, that under a water pressure of, such as 2 Kg/cm$^2$, the time for filling a toilet tank of average size still requires more than two minutes and filling is rather slow. In the cases where the toilet must be flushed a number of times to effect a complete flushing, a user has to wait a longer time between flushes until the tank has been sufficiently filled with water, which must be very inconvenient.

It is the purpose of this invention to ameliorate the aforesaid disadvantages in the conventional fill valve and to provide a novel fill valve for use with toilet tanks.

Accordingly, it is an object of this invention to provide a fill valve for toilet tanks, comprising principally a valve body including a main valve disposed on the upper end of an inlet pipe and applying the difference in pressure to open and close the valve for filling the tank with water and an auxiliary valve, as diaphragm, being actuated by air pressure to direct the opening and closing of the main valve, whereby it is relieved from the use of a float bowl device, the fill valve further devoid of any changes generally associated with the water supply pressure owing to the control by difference in the pressure enabling the valve to be opened and closed effectively and precisely with enough forces and further enlarging the diameter of opening in the valve seat to greatly increase the amount of flow so that the tank can be rapidly filled with water thereby reducing the time required for water filling.

It is a further object of the invention to provide a fill valve for toilet tanks capable of being simplified in construction and reduced in form for having no float bowl nor connecting arm member of rather large shape and also being not easily run into malfunction.

It is yet another object of the invention to provide a fill valve for toilet tanks being so configurated that under the auxiliary valve thereof is mounted a telescopic extensible air cylinder capable of guiding in working air and being also extensibly adjustable to function in adjustment of the water level in the tank.

A further object of the invention is to provide a fill valve for toilet tanks, in which the valve assembly is capable of extensibly adjusting the level of water by way of a pair of extensible inlet and outlet pipes having inner and outer water pipes of the upper section and inner and outer water pipes of the lower section in an upper and lower fitting-in arrangement and also capable of adjusting the water level in the tank by way of extensible adjustment of the inlet pipe mounted by the lower end thereof on the upper end of the supply pipe in the tank, the lower water relief pipe provided on the outer circumferential face thereof with a plurality of longitudinal disengaging grooves and transverse retaining channels and the corresponding water relief pipe of the upper section fitted over on the outside provided on the interior thereof with at least one positioning locking piece engageable in the channels, whereby the arrangement allows the upper outside water relief pipe to perform readily vertical movement and positioning through the disengagement of the locking pieces from the channels by merely rotating and lifting or lowering water relief pipe of the upper section to thereby facilitate adjustment of the water level in the tank and also simplify the adjustment construction with attendant advantage to manufacture.

BRIEF DESCRIPTION OF THE DRAWINGS

The foregoing and other objects, features and advantages of the invention may be best understood from the following detailed description of the embodiments of the present invention, as illustrated in the accompanying drawings, wherein.

DETAILED DESCRIPTION OF PREFERRED EMBODIMENT OF THE INVENTION

With reference now to FIGS. 1–6 of the accompanying drawings, there is illustrated a fill valve of the present invention, which includes a valve assembly 1 for opening and closing the flow of water and a pair of pipes, inlet pipe 2a and outlet pipe 2b, mounted on one side of the valve assembly 1 and communicating respectively with the outlet openings and inlet port of the valve assembly 1.

Figures 1, 2:
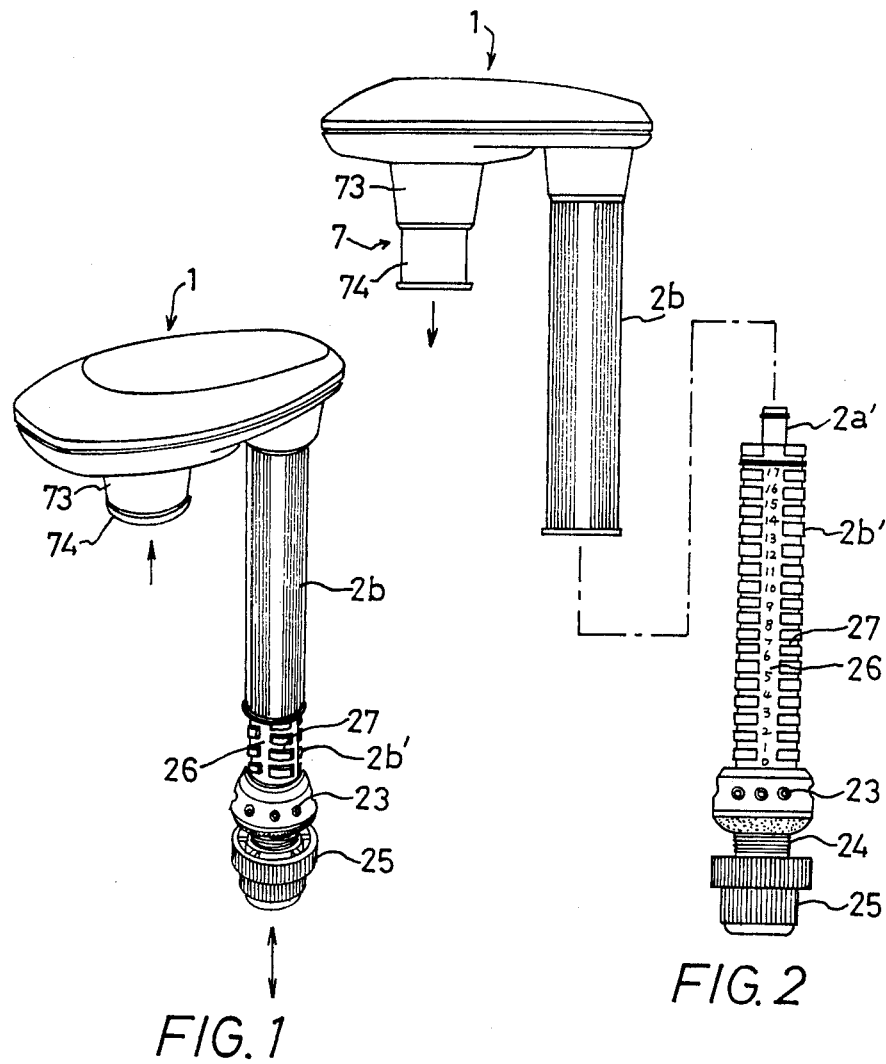
FIG. 1 is a perspective view of a fill valve in toilet water tank in accordance with the invention.
FIG. 2 is an exploded perspective view of the fill valve according to the invention.
Figure 3:
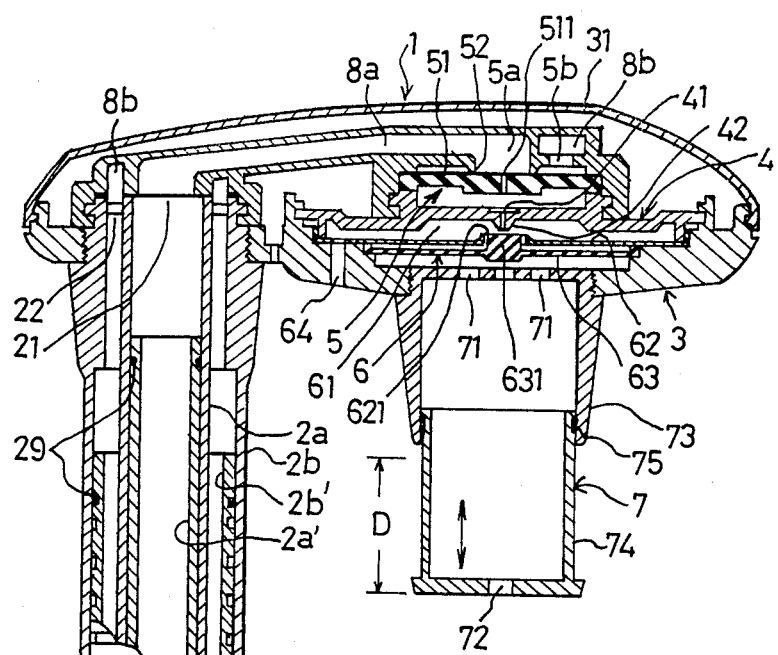
FIG. 3 is a vertical sectional view of the fill valve according to the invention.
Figure 4:
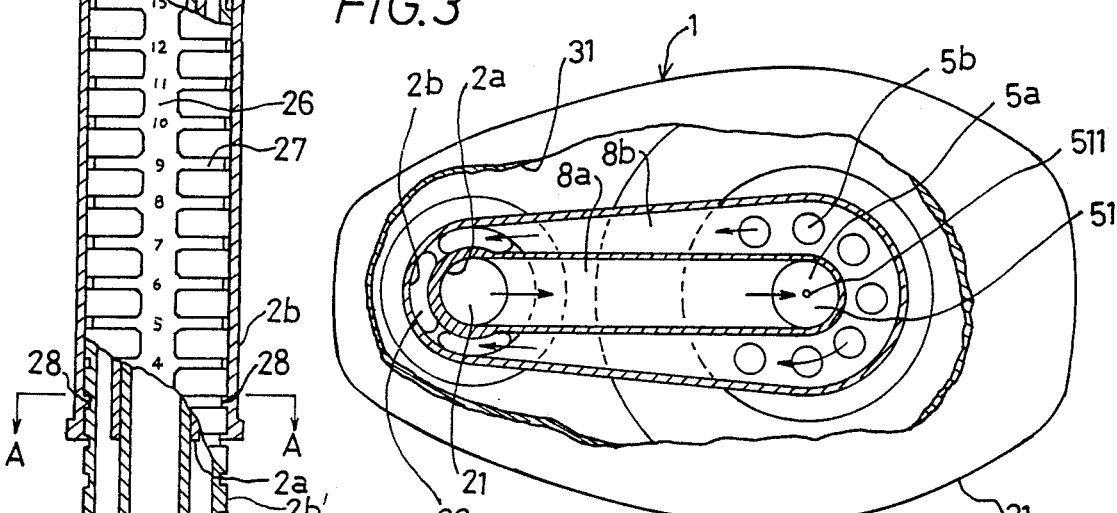
FIG. 4 is a top view of the essential part of the first embodiment in section.
Figure 5:
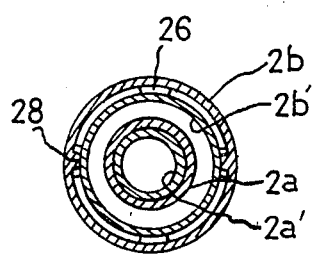
FIG. 5 is a sectional view of the essential part of the first embodiment, taken along the line A—A of FIG. 3.

The valve assembly 1, as shown in FIGS. 1, 3 and 4, includes a somewhat flat valve body 3, a median partition 4 disposed on top of the valve body 3 and having in the center a small through hole 41 and protruding from there below a guide valve seat 42 communicating with said through hole 41, a main valve disposed slightly above the median partition 4 of the valve 5 body 3 for opening and closing the flow of water, an auxiliary valve 6 disposed slightly below said median partition 4 for guiding the opening and closing of the main valve 5, an extensible air cylinder 7 suspendingly mounted beneath the auxiliary valve 6 for guiding in working air and for adjusting the level of water in a toilet flush tank, and a pair of passageways, an intake passageway 8a and an outlet passageway 8b, crossing over to communicate between upper openings 21, 22 of the inlet and outlet pipes 2a, 2b on the one side and the inlet and outlet openings or ports 5a, 5b of the main valve 5.

The main valve 5 comprises a diaphragm 51 having in the center a small through hole 511 and being secured in place slightly above the median partition 4 by the periphery thereof. This diaphragm 51 constantly elastically closes a downwardly protruding valve seat 52 communicating with the inlet port 5a, the part on the upper side of the diaphragm 51 peripheral to the valve seat 52 communicates with the outlet openings 5b. That is to say, the inlet port 5a of the main valve 5 is disposed at a middle location, whereas the outlet openings 5b are concentrically arranged at location peripheral to the inlet port 5a. When subjected to water pressure action, this diaphragm 51 is capable of elastically moving downwardly to open the inlet valve seat 52. Again, as the area on the bottom of the diaphragm 51 is much larger than the area correspondingly on the top of the inlet port 5a, the diaphragm 51 is thus able to use the difference in pressure to close the valve seat 52, details of which function will be dealt with hereinafter. Also, in the figures, the reference numeral 31 denotes an upper lid being provided on the valve body 3; it is however equally possible if the valve body 3 is without provision of the upper lid 31, since the main valve 5 is sealed on the above.

The auxiliary valve 6 comprises a guide plate 62 being disposed in a valve chamber 61 located slightly below the median partition 4 and having in the middle a guide hole 621. A diaphragm 63 is retained by the periphery thereof beneath the guide plate 62 and protruding out from the center is a contact projection 631 which passes through the guide hole 621 of the guide plate 62 to be able to close the guide valve seat 42 upon being elastically moved upward. The contact projection 631 is normally constantly maintained at an appropriate clearance from the guide valve seat 42 in the above and when lower side of the diaphragm 63 is under pressure and elastically moved upward, this contact projection 631 also follows the upward movement to thereby close that guide valve seat 42. Furthermore, inside the valve chamber 61 where it is close to the circumference there is provided a relief hole 64 passing through the valve body 3 to communicate with the outside, the function of which will be described later.

Returning again to FIGS. 2 and 3, the extensible air cylinder 7 as shown is comprised of a plurality of outer and inner sleeve pipes 73, 74 being fitted one over the other and defined with at least one through holes 71, 72 respectively on the upper and lower end faces thereof and in the present embodiment, there are two pipes, one outer and one inner. These two sleeve pipes 73, 74 are held in appropriate tightness and sealedness through the intermediary of frictional force of an 0-ring 75 disposed therebetween.

In the present embodiment, the inner inlet pipe 2a and the outer outlet pipe 2b are also constructed to be of an extensible configuration, that is, the inlet and outlet pipes 2a, 2b form an extensible double sleeve pipe having the upper and lower sections formed in an upper and lower and outer and inner fitting configuration. An outlet 23 for relief of water is however provided on the lower end outer circumference of outer outlet pipe 2b' of the lower section, whereas inner inlet pipe 2a' which should be of the lower section is now formed at the lower end thereof with a thread connecting portion 24, which when fitted with a usual pipe joint attachment 25 can be connected to the end of the supply pipe within the bottom of the flush tank (not shown). Again, inlet and outlet pipes of the upper and lower sections are held in sealedness and in an appropriate tightness through the intermediary of an 0-ring 29.

The positioning construction for adjustment by extension of the aforesaid outlet and inlet pipes 2a, 2b, 2a', 2b' is illustrated in FIGS. 1, 2, 3 and 5. The construction includes on the outer circumferential face of outlet pipe 2b' of the lower section at least one longitudinal disengaging groove 26 and a plurality of equispaced transverse retaining channels 27 communicating with the disengaging groove 26 and on the inner circumferential face at the lower end of outlet pipe 2b of the upper section a locking piece 28 to be engaged in the aforesaid groove and channels 26, 27. In this embodiment of the invention, there are four symmetrically arranged 90° spaced apart disengaging grooves 26 and two 180° oppositely arranged locking pieces 28, those functions will be described in detail later.

The following is a description on the use and working of the fill valve in the first embodiment of the present invention after its installation in a toilet flush tank.

Firstly, when the fill valve of the present invention has not opened the source of water to flow into the tank and to work flushing, the main valve 5, as shown in FIG. 3, closes the inlet valve seat 52 by means of its diaphragm 51, and the contact projection 631 on the diaphragm 63 of the auxiliary valve 6 is in the position to open the guide valve seat 42.

Figure 6A:
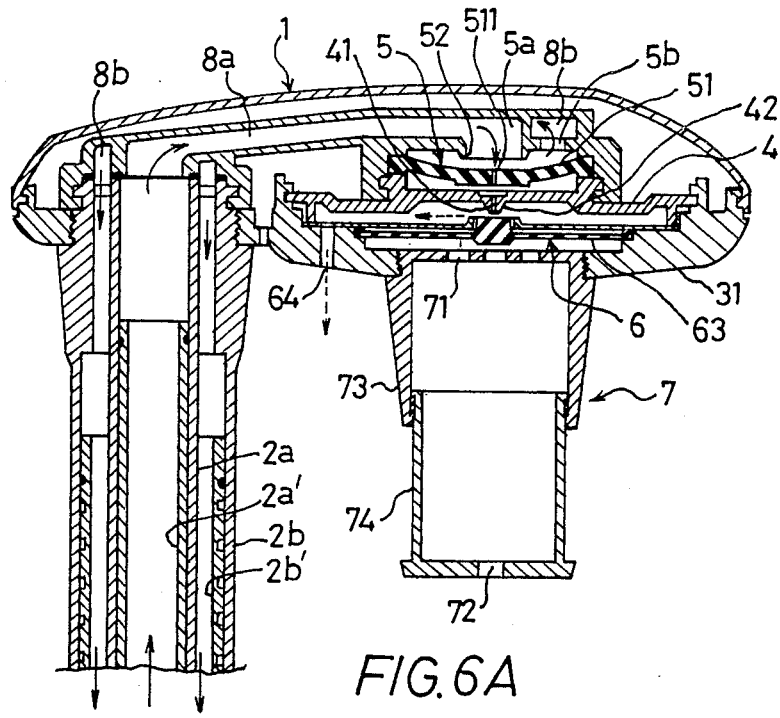
FIGS. 6A and 6B are illustrations showing the use condition of opening and closing of the valve in the first embodiment of fill valve respectively during and after filling of water.

When the source of water in the tank has been opened to effect flushing as depicted in FIG. 6A, the water passes from the supply pipe at the bottom of the tank (not shown) into inlet pipes 2a', 2a of the upper and lower sections on one side of the fill valve and into the intake passageway 8a to arrive in the inlet port 5a of the valve seat 52. The water pressure forces the diaphragm 51 to be elastically depressed thereby opening up the valve seat 52. Following this action, water flows out towards the outside and through the outlet openings 5b and passes into the outlet passageway 8b, and next downwardly through the passage defined between the outer side of inlet pipe 2a and the inner side of outlet pipe 2b to flow downwardly into the water outlet 23 on all sides at the lower end of outlet pipe 2b' of the lower section and then into the tank to effect flushing. At this time, part of the water for guiding purpose passes through the small through hole 511 on the diaphragm 51 and the small through hole 41 on guide valve seat 42 of the median partition 4 and flows into the valve chamber 61 of auxiliary valve 6 and through the relief hole 64 on one side and into the tank.

Figure 6B:
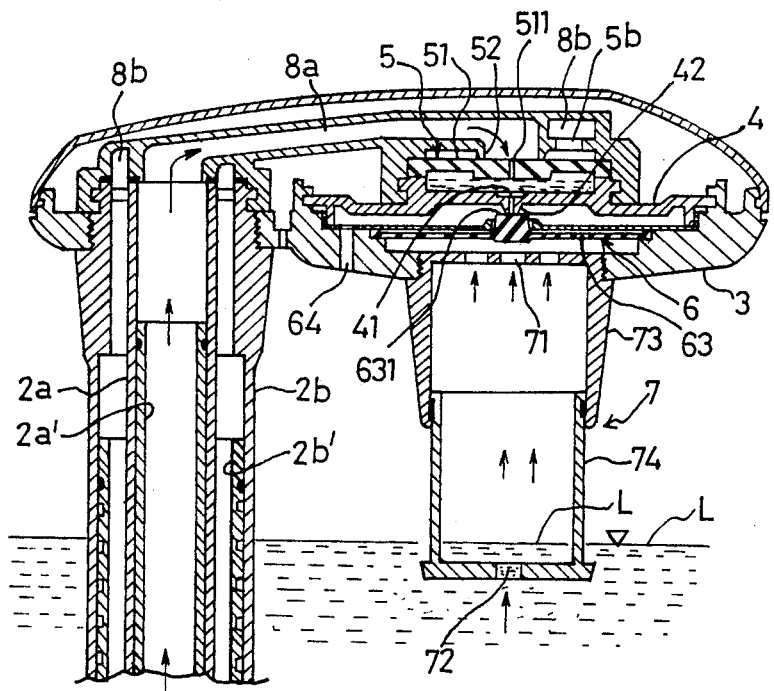

Afterward, when the level of the water has gradually risen in the tank and has submerged the lower end of the extensible air cylinder 7 as shown in FIG. 6B, because water passes through the through hole 72 at lower end or the air cylinder 7 and flows into the latter, there is thus formed a sealed space inside this cylinder 7. Following the slight rising-up of the water level L, air inside the cylinder 7 becomes compressed and the compressed air then passes through a plurality of through holes 71 on the upper part of the cylinder to press on the bottom side of the diaphragm 63 thereby forcing the diaphragm 63 to move upwardly in a protruding manner and also with the contact projection 631 thereof to close the guide valve seat 42 and to thereby shut off the water for guidance. During this time, as the area on the bottom of the diaphragm 63 is much larger than that of the corresponding valve seat 42, the action will continue until the diaphragm 63 is able to effectively close the said guide valve seat 42 with sufficient difference in the pressure between the upper and the lower sides. Subsequently, as a result of closing of this valve seat 42, part of the pressure flow of water passes through the small through hole 511 facing the valve seat 52 to flow into the space below the diaphragm 51 whereby it rapidly increases the pressure on the lower part of the diaphragm 51. Flow of water through the valve seat 52 and onto the top of the diaphragm 51 leaks out rapidly through the outlet openings 5b to relieve the pressure. When the pressure on the lower side of the diaphragm 51 has increased to where the pressures on the upper and the lower sides of the diaphragm 51 of the main valve 5 are equalized the diaphragm 51 closes the valve seat 52 by its own elasticity to thereby cut off the flow of water and to stop filling of water in the tank. Since up to then the flow of water on the above or on top of the diaphragm 51 through the valve seat 52 through the outlet openings 5b had been able pass to release the pressure, the total pressure borne on the larger area beneath the diaphragm 51 thus become far more greater than the total pressure acting on the upper side of the corresponding valve seat 52. Due to such difference in pressure in that part of the fill valve there occurs a strong forcing of the diaphragm 51 to effectively close the valve seat 52, that is, the diaphragm 51 is readily capable of producing a sufficient pressure for closing the valve and can do so even if the source of water has a higher pressure. The fill valve of the present invention is hence devoid of the drawback usually encountered with the conventional fill valve where the valve is not readily closed when water pressure is high. It is possible to enlarge the diameter of openings in the inlet pipes 2a, 2a', intake passageway 8a, inlet port 5a and valve seat 52 and thus be capable of increasing greatly the amount of flow and accelerating the filling of the tank in order to reduce the time required for the filling. For instance, under the same water pressure of 2 Kg/cm$^2$ as alluded to above, the diameter of the opening in the inlet piping to valve seat 52 in the present fill valve may be made with an enlargement of about 10-12 cm whereby time required for filling of water will be about 30 seconds only, which is far more advantageous than the conventional fill valve in toilet tank of similar type.

Now, the adjustment of water level in accordance with the principle of the invention will be described, in which the adjustment can be readily attained by the following two methods:

1. Method by regulating the extensible air cylinder 7: In this air cylinder 7, as shown in FIG. 3, the extensible length that can be regulated is D, and to regulate the amount of protrusion in sleeve pipe 74 of the lower section is just to draw the pipe directly by hand. In this way, it is thus possible to control the time, to advance or to delay, of the through hole 72 at the lower end of the pipe being submerged under the surface of water. In another words, it is possible to advance or delay the time for the air so sealed inside the cylinder 7 to be subjected to compression and consequently to bring forward or delay the working of the auxiliary valve 6 to direct the opening and closing of the main valve 5. In this way, it can be accomplished the timing adjustment and thus the regulation of water level in the tank. On the other hand, if the said air cylinder 7 is composed of more than two sections of pipes to enlarge the extensibility length of the cylinder it would make possible the achievement of regulating the level of water within an even greater range.

2. Method by regulating the extensible inlet and outlet pipes 2a, 2b: To regulate the level of water in the tank, hold the valve assembly 1 with both hands and slightly turn inlet and outlet pipes 2a, 2b of the upper section on one side of the assembly round in order to allow the locking pieces 28 on outlet pipe 2b of the upper section to pass from the respective retaining channels 27 on the outside of outlet pipe 2b' of the lower section into the disengaging groove 26. In this way, it makes possible for the valve assembly 1 together with inlet and outlet pipes 2a, 2b of the upper section to be raised and adjust the height. When the valve assembly 1 has reached the required height of water level, it is possible again by rotation operation to allow the locking pieces 28 on outlet pipe 2b thereof to pass from the disengaging groove 26 on outlet pipe 2b' of the lower section into the respective retaining channels 27. As such, inlet the and outlet pipes 2a, 2b of the upper section will no longer move up and down thus achieving adjustment in the height of the valve assembly 1 and then the regulation of height at the lower end of the air cylinder 7 so that it makes possible the adjustment of height of the water level in the tank.

Figure 7:
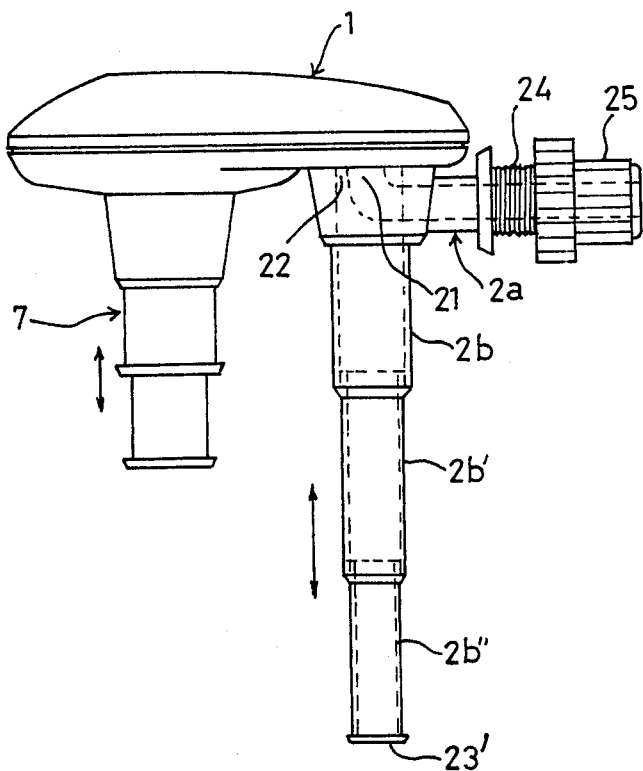
FIG. 7 is a front view of the fill valve in a further embodiment.

A further embodiment of the fill valve of the invention is as shown in FIG. 7, in which the construction of most parts is same as in the first embodiment, the difference lying only in that the inlet valve of this embodiment is adapted for installation in a toilet tank on the terminal of a supply pipe on the lateral side. For this reason, the exposed inlet pipe 2a and the outlet pipe 2b are formed of a perpendicular configuration, in which the numerals 21, 22 respectively denote the upper opening in both pipes and which thus allows the outlet pipes 2b, 2b', 2b'' to extend downwardly and through water discharge hole 23' to fill the tank with water. These outlet pipes 2b, 2b', 2b'' constitute a multi-section extensible pipe, which on the basis of the depth in a toilet tank or the height of the terminal of the lateral supply pipe enables an adjustment to be made on the water discharge hole 23' so that the latter may be as much close to the lower part of the tank as possible in order to reduce the noises of running water during filling. Although the extensible air cylinder of the present embodiment is made into three section, it may also be appreciated that the pipe is formed in two sections or more sections for adjusting height of the water level.

In the fill valve of the present invention, control of the opening and closing of the valve is mainly by difference in the pressure, hence there is possibility to increase diameter of the opening in the valve seat and enhance the amount of flow whereby it saves the time of water filling. Besides, since the fill valve is of an almost sealed configuration and devoid of any pivoting members of a conventional valve inside the fill valve, chances of malfunction or being damaged by collision can be greatly reduced. Furthermore, most of the parts of the fill valve are made by molding of plastics, which not only reduces the cause for worry of being stained and also makes the manufacture easier Since with the fill valve of the present invention it can readily be performed by extension of the extensible air cylinder the adjustment of water level and also through some simple constructions such as locking pieces and channels on the side extensible inlet and outlet pipes it can readily be accomplished the adjustment of water level by extending of the pipes, its uses and manufacture can thus be very convenient and also because of the shape which can be made in smaller sizes, the fill valve will not occupy much spaces in the tank.

What is claimed is:

1. A fill valve mechanism for toilet flush tanks comprising a valve assembly and pipe means disposed on one side of said valve assembly, said pipe means including an inlet pipe connectible at a lower end thereof to the upper end of a supply pipe at the bottom of a tank, and an outlet pipe having at a lower end thereof, a water discharge hole, said valve assembly including:

a generally flat valve body containing generally horizontally extending intake and outlet passageways communicating with upper ends of said supply and outlet pipes, respectively, said intake passageway terminating in a downwardly facing valve seat, said outlet passageway terminating in a downwardly facing outlet opening disposed next to said valve seat, a median partition mounted on said valve body beneath said valve seat and said outlet opening and having in a center thereof a small through-hole and on a lower side thereof a protruding seat communicating with said through-hole, a main valve for opening and closing the flow of water disposed beneath said valve seat and said outlet opening and slightly above said median partition, said main valve comprising a first elastic diaphragm secured along its outer periphery and arranged to normally close said valve seat anD said outlet opening and being flexible downwardly by water pressure to open said valve seat and said outlet opening, said first diaphragm including a small through-hole to communicate said intake passageway with a space formed between said first diaphragm and said median partition, a bottom surface of said first diaphragm defining a greater area than said valve seat, an auxiliary valve for regulating the opening and closing movements of said main valve disposed slightly beneath said median partition, said auxiliary valve comprising:

a rigid guide plate secured at its outer periphery and including an aperture at about its center, and a second elastic diaphragm secured at an outer periphery thereof below said guide plate, a portion of said second diaphragm being disposed inwardly of said outer periphery and being spaced below said guide plate so as to be movable upwardly and downwardly relative to said guide plate, said second diaphragm including a projection freely slidably disposed in said aperture, said projection normally spaced below said protruding seat to keep open said through-hole in said median partition, said second diaphragm being flexible by air pressure toward said median partition whereby said projection slides upwardly in said aperture to close said through-hole in said median partition so as to maintain a positive alignment therewith and an extensible cylinder disposed below said second diaphragm and open at its lower end to communicate with an interior of the tank to conduct pressurized working air toward said second diaphragm when rising water in the tank closes off said lower end of said air cylinder and continues to rise, whereby said second diaphragm is raised to close said through-hole in said median partition, enabling pressure to equalize above and below said first diaphragm whereupon said first diaphragm rises to close said valve seat and said outlet opening responsive to a predetermined vertical adjustment of said extensible air cylinder.

2. A fill valve mechanism according to claim 1, wherein said pipe means includes upper and lower telescoping sections, each of said sections carrying part of said inlet pipe and part of said outlet pipe, one of said upper and lower sections including at least one vertically extending groove and a plurality of vertically spaced, circumferentially extending retaining channels, the other of said upper and lower sections including at least one radially projecting locking piece receivable in said at least one groove to permit vertical extension of said sections, and selectively receivable in one of said retaining channels in response to relative rotation between said sections to retain said sections in positions of relative vertical adjustment.

3. Apparatus according to claim 1, wherein said outlet passageway is annular as viewed in plan and extends around said intake passageway.

* * * * *